United States Patent
Viola

(10) Patent No.: US 8,127,871 B2
(45) Date of Patent: Mar. 6, 2012

(54) FRAME WALKER PREDICATED ON A PARALLEL MECHANISM

(76) Inventor: Robert J Viola, Jackson, WY (US)

(*) Notice: Subject to any disclaimer, the term of this patent is extended or adjusted under 35 U.S.C. 154(b) by 573 days.

(21) Appl. No.: 12/264,064

(22) Filed: Nov. 3, 2008

(65) Prior Publication Data

US 2010/0107795 A1    May 6, 2010

(51) Int. Cl.
*B62D 57/032* (2006.01)
(52) U.S. Cl. .................. 180/8.6; 318/568.12; 180/8.5
(58) Field of Classification Search .............. 180/8.1, 180/8.5, 8.6
See application file for complete search history.

(56) References Cited

U.S. PATENT DOCUMENTS

| | | | |
|---|---|---|---|
| 4,637,777 A | 1/1987 | Smulders et al. | |
| 4,662,465 A * | 5/1987 | Stewart | 180/8.1 |
| 4,666,362 A | 5/1987 | Landsberger et al. | |
| 5,151,859 A | 9/1992 | Yoshino et al. | |
| 5,374,879 A | 12/1994 | Pin et al. | |
| 6,671,975 B2 * | 1/2004 | Hennessey | 33/645 |
| 2003/0106230 A1 | 6/2003 | Hennessey | |
| 2004/0079844 A1 * | 4/2004 | Bailey | 248/127 |
| 2005/0126833 A1 * | 6/2005 | Takenaka et al. | 180/8.1 |

FOREIGN PATENT DOCUMENTS

WO    WO/2006/107663 A2    10/2006

OTHER PUBLICATIONS

K. Mitobe et al., "Control of a Biped Walking Robot during the Double Support Phase", Autonomous Robots 4, 287-296 (1997).
R. Ben-Horin et al., "Kinematics, Dynamics and Construction of a Planarly Actuated Parallel Robot", (1999).
Bruyninckx, H., "Mobile Robots", The Robotics WEBook, http://roble.info/, (2005).
Pratt, J et al., "Intuitive Control of a Planar Bipedal Walking Robot", Proc. 1998 Intl. Conf. on Robotics and Automation (1998).
Plestan, F et al., "Stable Walking of a 7-DOF Biped Robot", IEEE Trans. Robotics and Automation (2002).
Porta, J et al., "On the Trilaterable Six-Degree-of-Freedom Parallel and Serial Manipulators".

* cited by examiner

*Primary Examiner* — Tony Winner
(74) *Attorney, Agent, or Firm* — NUPAT, LLC; Morrison Ulman

(57) ABSTRACT

A frame walker robot based on two sections connected by a parallel mechanism is described. The walker can step in any direction and can pose its free section in any orientation. Prismatic, rather than revolute, joints are used, leading to a scalable design.

17 Claims, 7 Drawing Sheets

FRAME WALKER PREDICATED ON A PARALLEL MECHANISM

TECHNICAL FIELD

The disclosure is related to the field of walking robots, and in particular, frame walkers.

BACKGROUND

Robots that move themselves across prepared tracks, rough terrain, or even submerged surfaces are useful for myriad tasks such as mine sweeping, hull inspection, excavation, reconnaissance, warehouse automation, et cetera. Moving robots have been made in widely varying forms from wheeled vehicles to anthropomorphic walkers having legs with knees, ankles and feet.

Legged robots, in general, do not scale easily to large sizes. The reason is the strong influence of dynamics in their operation. Inertia forces (and moments of inertia) scale as the fourth power of linear dimension. However, the force available from an actuator, such as a muscle or hydraulic cylinder, that provides force in proportion to its cross-section increases as only the square of linear dimension.

A frame walker is a type of legged robot that has two sections connected by a mechanism. Usually each section has three or four legs. A frame walker moves by using the mechanism to lift one section off the ground while resting on the other section. After the lifted section has been moved to a new location, the mechanism lowers it and lifts the other section. The mechanism alternates lifting, moving, and lowering the sections to make the robot take steps. At any given time, the robot is supported by whichever section is not lifted.

Frame walkers are simpler in their scaling behavior than general legged machines. Frame walkers do not use continuous relative rotational motion and they are operated in a statically stable manner with approximately constant velocity. Conventional frame walkers do use relative rotational motion to change direction; that is done slowly to keep inertial moments within acceptable bounds.

In a conventional frame walker two sections are connected by a serial mechanism, meaning one in which actuators for different degrees of freedom are connected serially. (An example of a serial mechanism is a person's arm: wrist motion is connected to shoulder motion serially through the elbow joint.) Serial mechanisms usually offer good range of motion which enables a frame walker predicated on a serial mechanism to take long strides.

Significant room for improvement exists in the field of frame walkers. For example, it would be useful to have a frame walker that could take a step in any direction or that could tip and tilt its lifted section. A design that was not subject to the scaling constraints that affect frame walkers based on serial mechanisms would permit larger size walking robots.

BRIEF DESCRIPTION OF THE DRAWINGS

The drawings are schematic for clarity.

DETAILED DESCRIPTION

Figure 1:
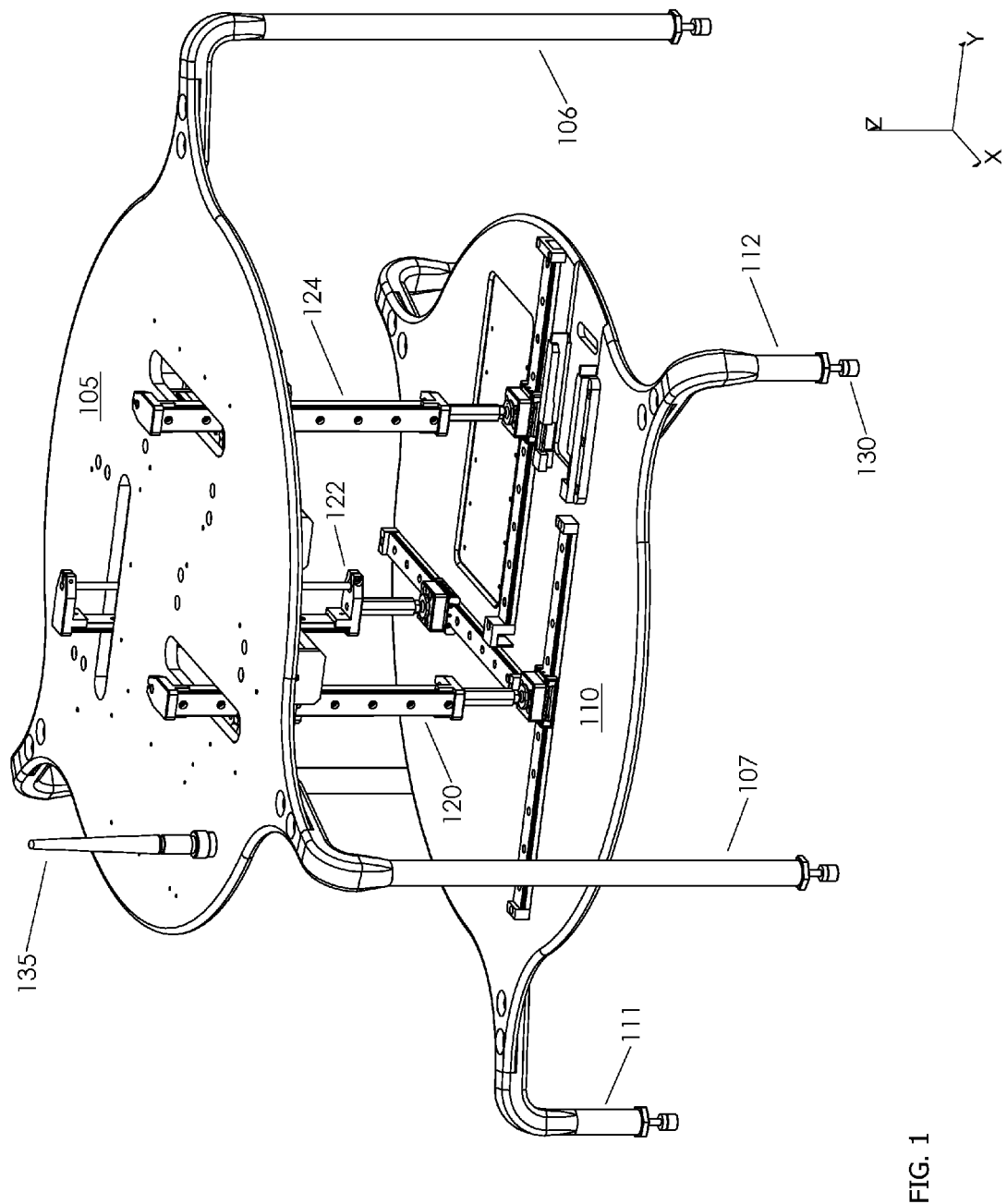
FIG. 1 shows a frame walker predicated on a parallel mechanism.

A new frame walker is now described in which sections are connected by a parallel mechanism. FIG. 1 shows an example of such a parallel walker. In this example, tripod sections are connected by a "tri-sphere" parallel mechanism. Tri-sphere mechanisms are described in U.S. patent application Ser. No. 11/960,307, "Constrained tri-sphere kinematic positioning system", incorporated herein by reference.

The walker shown in FIG. 1 uses prismatic rather than revolute joints. A prismatic joint, sometimes called a slider, provides linear motion along the joint axis. Prismatic joints connected to passive ball joints provide a design that is scalable to large sizes. (In contrast, revolute joints which provide rotational motion around a joint axis are more difficult to scale because torques and moments increase rapidly with the size of the joint.) The walker of FIG. 1 uses six linear actuators and three passive sliders.

A parallel frame walker is able to take steps in any direction or heading by adjusting the relative horizontal position of its upper and lower sections. When the walker is supported by the lower section, the upper section may be freely positioned in a wide range of attitudes. The free section has freedom of motion in pitch, roll, and yaw as well as x, y, z linear movement. This "pose control" may be useful for aiming a laser, solar cell, antenna or other device attached to the upper section. Alternatively, when the walker is supported by its upper section, the lower section is free to dig, grip, position tools, or perform other tasks.

The legs of the walker of FIG. 1 do not extend; however, they may be fitted with shock absorbers, suction cups, magnets, sensors or even writing implements. Furthermore a parallel frame walker may include systems, such as one or more global positioning system (GPS) receivers, for determining its position and orientation. Communication to and from the frame walker may be provided by radio, optical, acoustic, wired or wireless communication links.

Figure 2:
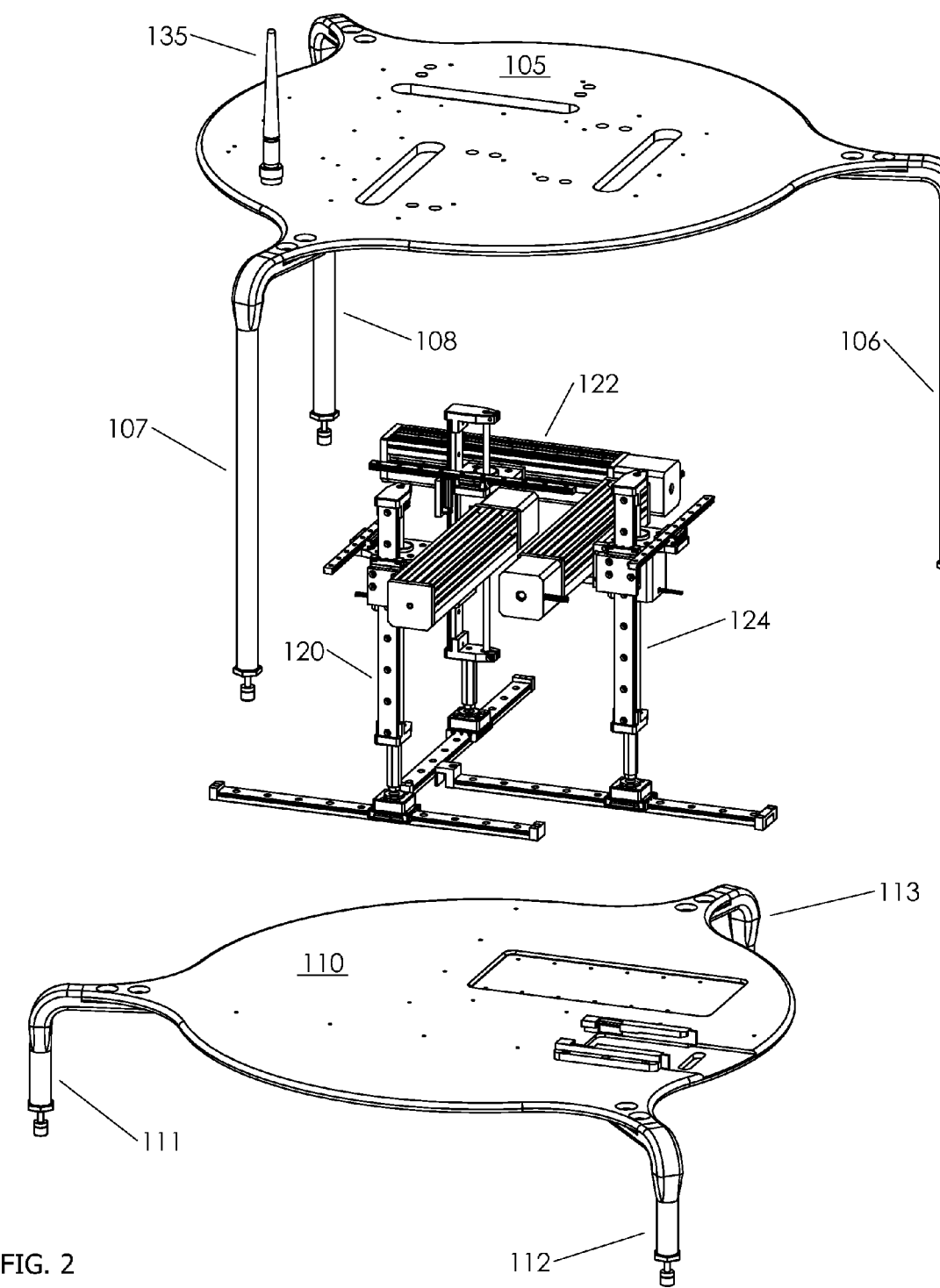
FIG. 2 is an exploded view of the frame walker of FIG. 1.

FIG. 2 is an exploded view of the frame walker of FIG. 1. In FIGS. 1 and 2, top section 105 is connected to bottom section 110 by a parallel mechanism comprising tri-sphere modules 120, 122, and 124. Top section 105 is a tripod that comprises legs 106, 107, and 108. Similarly, bottom section 110 is a tripod comprising legs 111, 112, and 113. Each of the legs is shown with an optional shock absorber, such as shock absorber 130. Antenna 135 is an example of an antenna that may be used for receiving positioning signals from GPS or for radio communications.

When a tri-sphere system is used as the parallel mechanism in a frame walker as in FIGS. 1 and 2, the tri-sphere modules are placed at the vertices of an isosceles triangle. In the example shown, the modules are placed at the vertices of an equilateral triangle to minimize the area between the sections that is devoted to the parallel mechanism and also to maximize the walker's yaw range.

Figure 3:
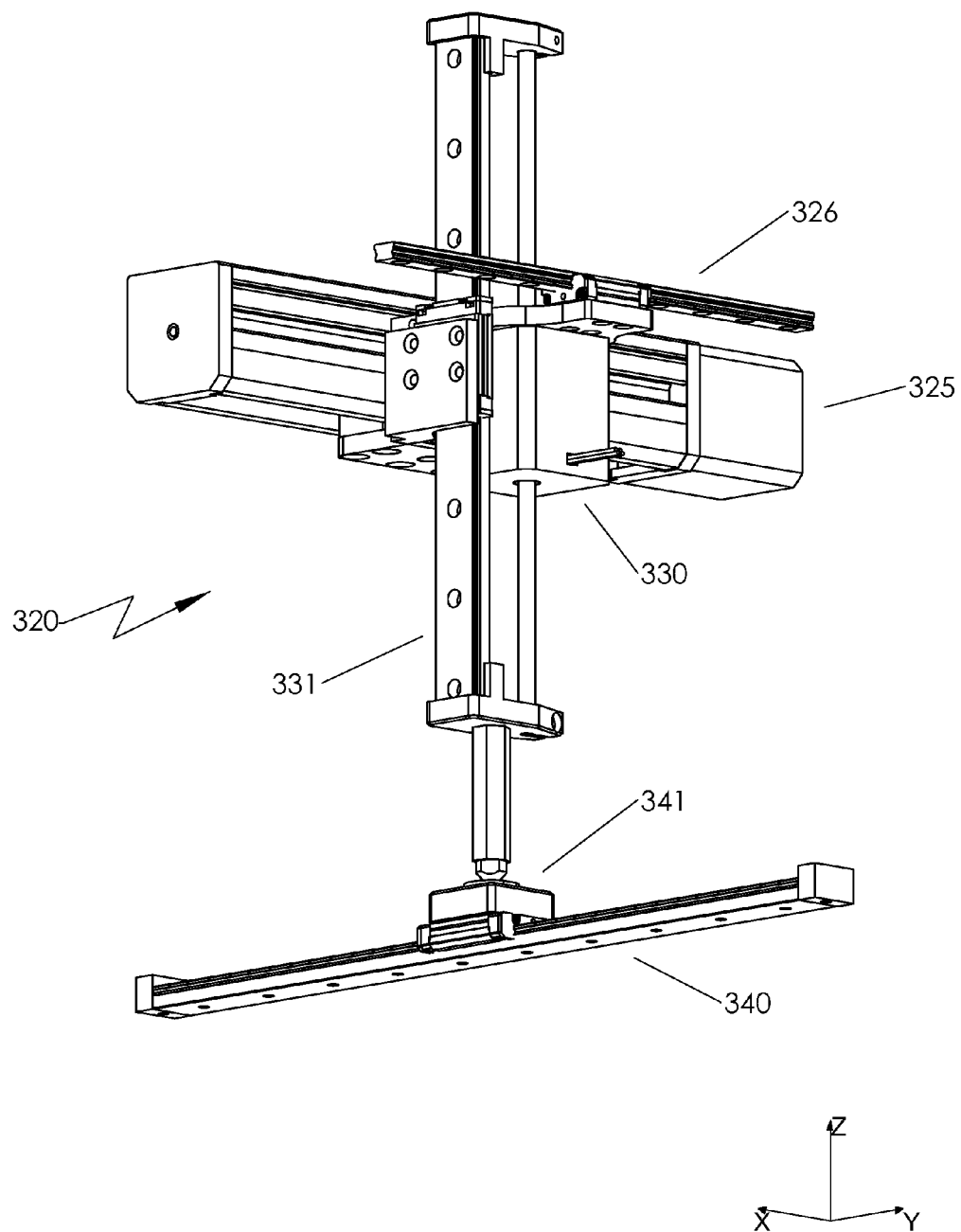
FIG. 3 shows a mechanism used in the frame walker of FIGS. 1 and 2.

Each tri-sphere module shown in FIGS. 1 and 2 includes a z-axis actuator, a horizontal (i.e. x or y) axis actuator, and a free sliding horizontal (i.e. y or x) axis rail perpendicular to the horizontal actuator. (The rail and the actuator are perpendicular when the robot is in its home position illustrated in the Figures; they may not remain perpendicular during maneuvers.) FIG. 3 shows a single tri-sphere module 320. In FIG. 3, horizontal actuator 325 provides motion along the x-axis and supports z-axis actuator 330. Z-axis actuator 330 is connected to y-axis rail 340 via passive ball joint 341. Linear actuators 325 and 330 may be based on lead screws, spline shafts, inchworm motors, hydraulic actuators or other linear actuator mechanisms. Optional balance rails 326 and 331 prevent rotation around the axes of actuators 325 and 330 respectively. If module 320 is rotated around its z-axis, then horizontal actuator 325 lies along the y-axis while rail 340 lies along the x-axis.

When three tri-sphere modules are used to form a parallel mechanism as in FIGS. 1 and 2, their z-axis actuators are parallel to one another. Each module has one actuated horizontal axis (x or y) and one perpendicular, passive horizontal axis (y or x). The actuated horizontal axes of two of the modules are parallel while the actuated horizontal axis of the third module is perpendicular to the other two. Similarly, the passive horizontal axes of two of the modules are parallel while the passive horizontal axis of the third module is perpendicular to the other two.

The parallel frame walker moves by combining the horizontal and vertical motion capabilities of its parallel mechanism repeatedly. The distance between the walker's top and bottom sections is changed by actuating the z-axis actuators. The walker can be configured so that either the top or bottom section's legs contact the ground while the legs of the other section are raised off the ground. Whichever section is off the ground may be moved linearly along the x, y, or z axes or rotated in pitch, yaw or roll. Reversing the z-axis actuators transfers the weight of the walker to the other set of legs thereby completing one step. This sequence is repeated to develop a gait. Any heading can be attained by adjusting the extent to which each horizontal actuator extends. The vertical and horizontal step size can be altered by limiting the motions of the corresponding actuators.

Figure 4:
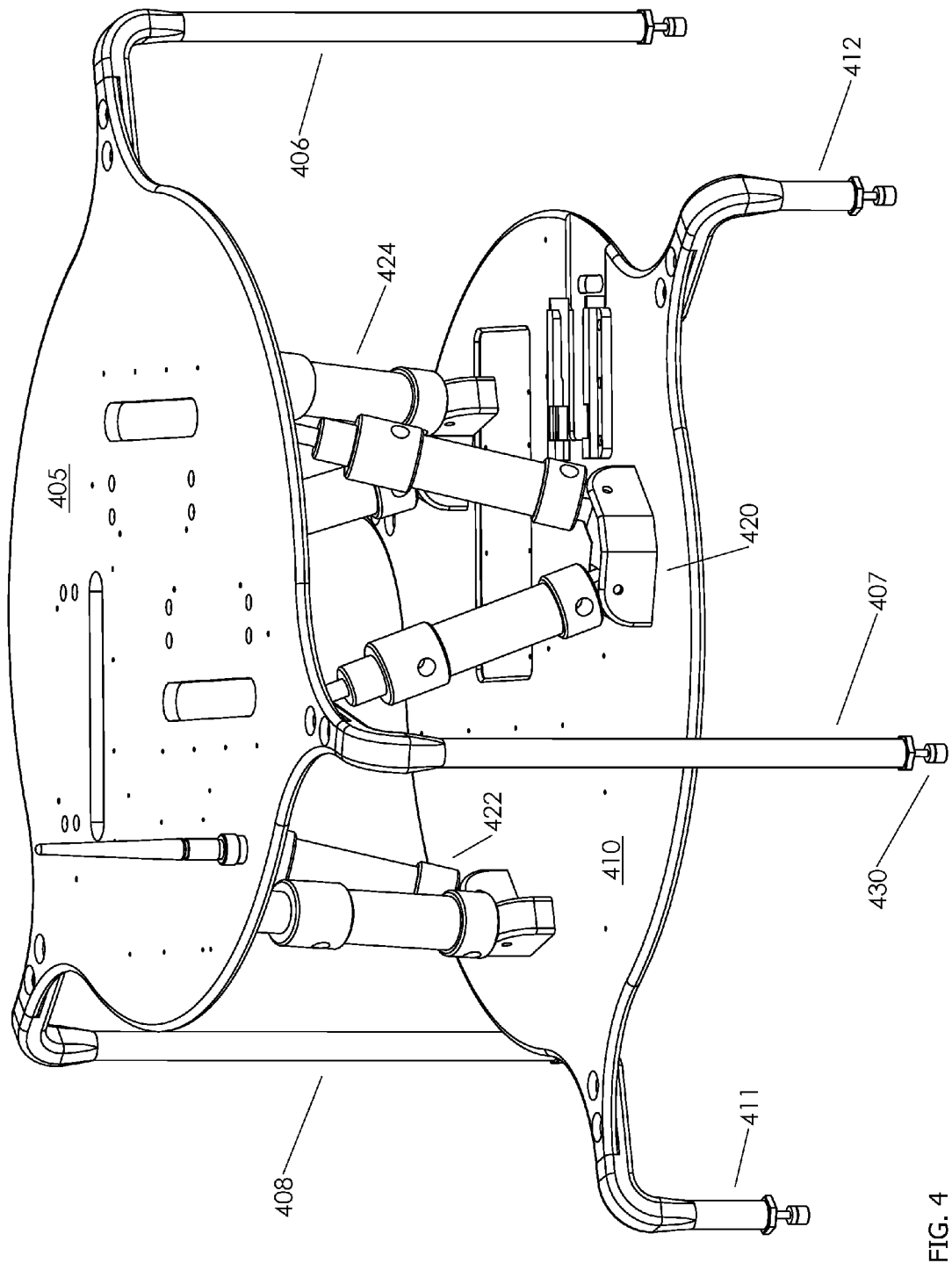
FIG. 4 shows a frame walker predicated on a hexapod.

The parallel frame walker is not limited to tri-sphere parallel mechanisms. For example, FIG. 4 shows a frame walker predicated on a hexapod. In FIG. 4, top section 405 is connected to bottom section 410 by a hexapod mechanism comprising modules 420, 422, and 424. Top section 405 comprises a tripod having legs 406, 407 and 408 while bottom section 410 comprises a tripod having legs 411 and 412. (The third leg of bottom section 410 is hidden in the figure.) The legs are equipped with optional shock absorbers such as 430. The hexapod is just one of many other parallel mechanisms that may be used to connect the top and bottom plates. Compared to a tri-sphere mechanism, the hexapod may have greater rigidity, but generally permits less travel along each axis.

Figure 5:
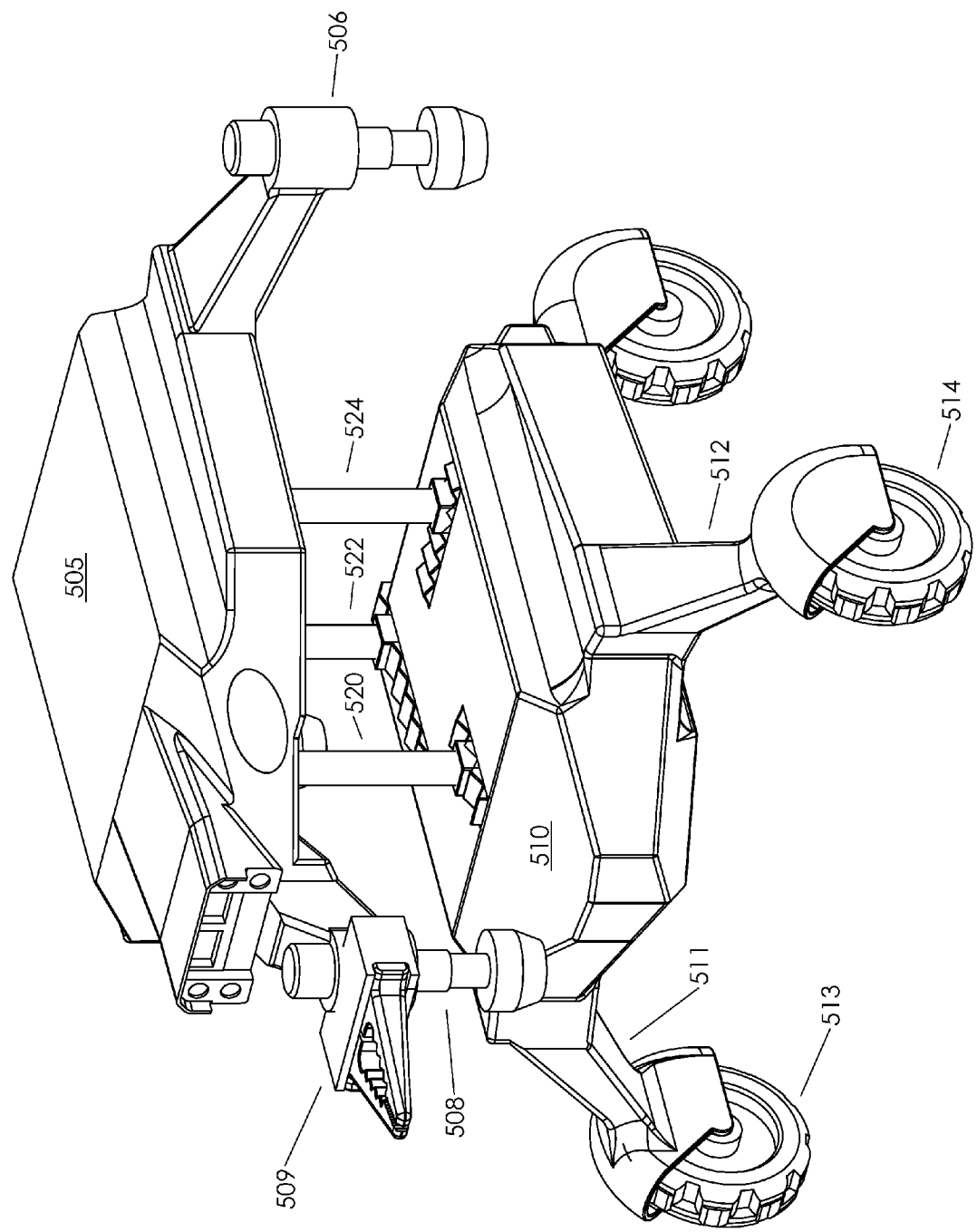
FIG. 5 shows a dual-mode frame walker with wheels.

Many variations of a frame walker predicated on a parallel mechanism are possible. FIG. 5, for example, shows a dual-mode frame walker with wheels. The frame walker illustrated in FIG. 5 comprises top section 505 connected to bottom section 510 by a tri-sphere parallel mechanism. Vertical actuators 520, 522, 524 of the parallel mechanism are visible while horizontal actuators and horizontal free sliding rails are hidden within the top and bottom sections. The top section has three legs, of which two, 506 and 508, are visible in the figure. Grabber tool 509 is mounted on leg 508. (Other tools may be mounted on any of the legs or on the top or bottom sections.) The legs may be extendable or of fixed length. The bottom section also has three legs, of which two, 511 and 512, are visible in the figure. The legs of the bottom section are equipped with wheels such as wheels 513 and 514.

The dual mode frame walker of FIG. 5 can move by taking steps as described above or it can use its wheels to drive like a conventional wheeled vehicle. The stepping mode is useful for rough terrain while the wheeled mode can achieve higher speeds over smooth ground. Wheels may also be mounted on the legs of the top section or on both sections' legs. A four wheeled vehicle may be made with two wheels attached to the top section and two to the bottom section. Steering may be accomplished by yawing the two sections with respect to one another.

Figure 6:
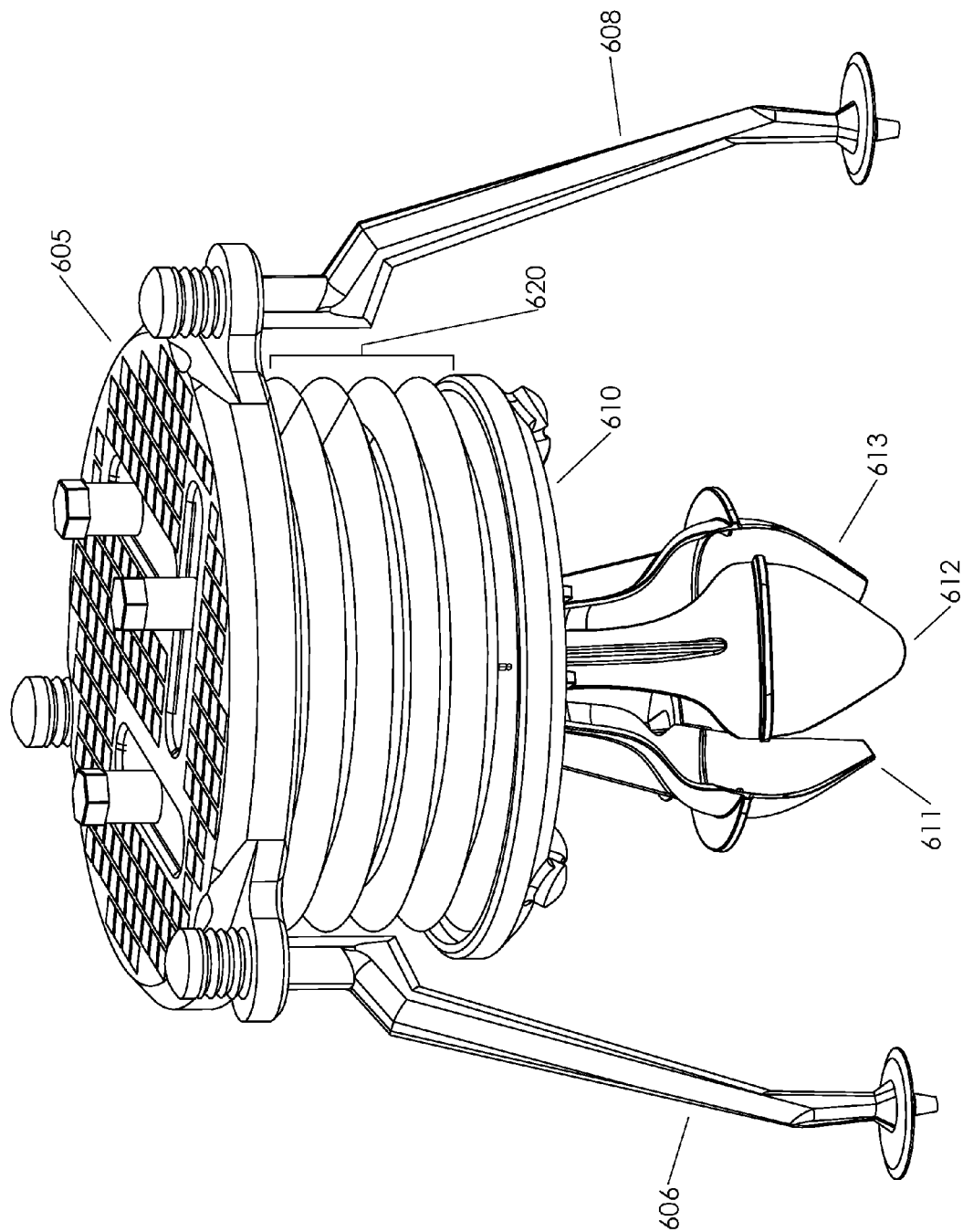
FIG. 6 shows a frame walker in which one of the tripods is also used as a digging implement.

FIG. 6 shows a frame walker in which one of the tripods is also used as a digging implement. In FIG. 6, top section 605 is connected to bottom section 610 by a parallel mechanism that is contained within housing 620. The parallel mechanism may be a tri-sphere mechanism, a hexapod, or other parallel mechanism. Top 605 and bottom 610 sections each comprise tripods. Top section comprises legs 606 and 608 for example (a third leg is hidden in the drawing). Legs 611, 612, 613 of the bottom section, however, are also adapted to function as digging tools. The parallel frame walker of FIG. 6 could therefore serve as an excavating robot for remote areas such as the surface of the moon.

Figure 7:
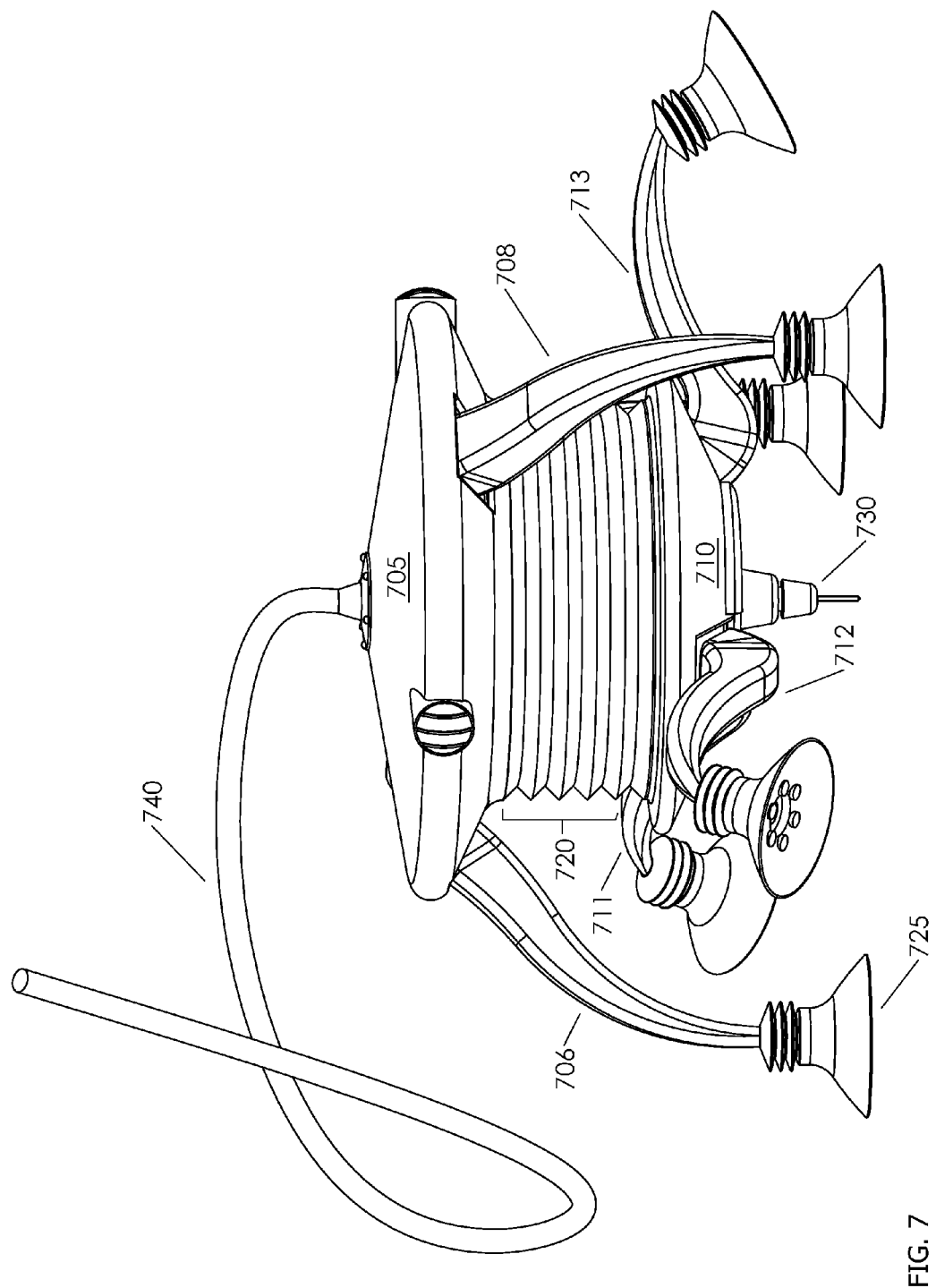
FIG. 7 shows a frame walker adapted for underwater applications.

FIG. 7 shows a frame walker adapted for underwater applications. Top section 705 of the underwater frame walker is connected to bottom section 710 by a parallel mechanism contained within housing 720. The top section comprises legs 706 and 708 (a third leg is hidden) while the bottom section comprises legs 711, 712 and 713. Also attached to the bottom section is drill 730. The legs of the top and bottom sections are equipped with suction-cup feet, such as suction cup 725, which allow the frame walker to grip smooth surfaces. Supply hose 740 may carry gases, liquids, electrical or optical signals to the frame walker. Clearly the design of FIG. 7 or of other frame walkers described herein may be modified by the attachment of tools including drills, wrenches, pliers, welders, measuring apparatus, etc. Further, magnets instead of suction cups can be used to grip magnetic surfaces.

The frame walker of FIG. 7 also differs from those of FIGS. 1, 4, 5 and 6 in that it has hinged legs. In FIG. 7 the legs of the bottom section (e.g. leg 713) are hinged up while those of the top section (e.g. leg 706) are fixed. This hinging action extends the vertical range of the parallel mechanism and keeps the legs from interfering with the drill or other tool.

The frame walkers predicated on parallel mechanisms described herein offer a new class of stepping robot that can travel on any heading and pose in any orientation. Their applications include such diverse functions as minesweeping, remote excavation and hull inspection.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A robot comprising:
   a first section comprising a first set of legs;
   a second section comprising a second set of legs; and,
   a single parallel mechanism directly connecting the first section to the second section.
2. The robot of claim 1 wherein,
   the parallel mechanism is a tri-sphere mechanism.
3. The robot of claim 2 wherein,
   the tri-sphere mechanism comprises three modules, each module having two perpendicular linear actuators and a free sliding rail.
4. The robot of claim 1 wherein,
   the parallel mechanism is a hexapod.
5. The robot of claim 1 wherein,
   the parallel mechanism comprises prismatic joints and passive ball joints.
6. The robot of claim 1 wherein,
   the parallel mechanism does not comprise revolute joints.
7. The robot of claim 1 wherein,
   the first set of legs comprises a tripod.
8. The robot of claim 1 wherein,
   the second set of legs comprises a tripod.
9. The robot of claim 1 wherein,
   each set of legs comprises legs having shock absorbers.
10. The robot of claim 1 wherein,
    one set of legs comprises legs having wheels.
11. The robot of claim 1 wherein, one of the sets of legs comprise legs having wheels.
12. The robot of claim 1 wherein, one of the sets of legs is a digging tool.
13. The robot of claim 1 wherein,
    each set of legs comprises legs having suction cup feet.
14. The robot of claim 1 wherein,
    a tool is mounted on one of the sections.
15. The robot of claim 14 wherein the tool is a drill.
16. The robot of claim 14 wherein the tool is a gripper.
17. The robot of claim 1 wherein,
    each set of legs comprises hinged legs.

* * * * *